United States Patent
Kamboj

(10) Patent No.: US 11,193,807 B2
(45) Date of Patent: Dec. 7, 2021

(54) PNEUMATIC PROBE

(71) Applicant: Toyota Motor Engineering & Manufacturing North America, Inc., Plano, TX (US)

(72) Inventor: Amandip Singh Kamboj, Brampton (CA)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 94 days.

(21) Appl. No.: 16/786,317

(22) Filed: Feb. 10, 2020

(65) Prior Publication Data

US 2021/0247223 A1 Aug. 12, 2021

(51) Int. Cl.
*G01F 23/16* (2006.01)
*G01F 22/02* (2006.01)

(52) U.S. Cl.
CPC .............. *G01F 23/16* (2013.01); *G01F 22/02* (2013.01)

(58) Field of Classification Search
CPC ................................. G01F 22/02; G01F 23/16
See application file for complete search history.

(56) References Cited

U.S. PATENT DOCUMENTS

| | | | |
|---|---|---|---|
| 1,508,969 A | 9/1924 | Guichard | |
| 2,691,304 A * | 10/1954 | Smith | G05D 23/024 |
| | | | 73/290 B |
| 3,375,975 A * | 4/1968 | Smith | G05D 23/024 |
| | | | 236/87 |
| 3,712,136 A * | 1/1973 | Monsen | F15C 1/005 |
| | | | 73/290 R |
| 3,777,852 A * | 12/1973 | Samalon | G01F 23/16 |
| | | | 184/103.1 |
| 4,572,097 A * | 2/1986 | Chapelsky | G01F 23/16 |
| | | | 116/227 |
| 4,763,518 A | 8/1988 | Daviaud et al. | |
| 5,251,482 A | 10/1993 | Bates et al. | |
| 2008/0185837 A1* | 8/2008 | Danielson | F16L 37/42 |
| | | | 285/86 |
| 2008/0265574 A1* | 10/2008 | Tiberghien | F16L 37/42 |
| | | | 285/328 |
| 2010/0148499 A1* | 6/2010 | Quere | F16L 37/1215 |
| | | | 285/310 |
| 2018/0156371 A1* | 6/2018 | Konishi | F16L 37/23 |

FOREIGN PATENT DOCUMENTS

| | | |
|---|---|---|
| DE | 102008054788 A1 | 6/2010 |
| WO | 2005114113 A2 | 12/2005 |

* cited by examiner

*Primary Examiner* — John Fitzgerald
(74) *Attorney, Agent, or Firm* — Christopher G. Darrow; Darrow Mustafa PC

(57) ABSTRACT

A pneumatic probe includes a port adaptor and a pneumatic core. The port adaptor includes an insertion head that includes a hook, and a backstop alongside the insertion head behind, and in spaced opposition with, the hook. The insertion head is reconfigurable between an expanded configuration and a contracted configuration. The backstop is movable, along the insertion head, between an extended position and a retracted position, in which the backstop is respectively advanced toward the hook and backed away from the hook. The pneumatic core includes a downtube extending through the insertion head, and a blocker on the downtube interfaced with the insertion head. The downtube is movable, through the insertion head, between a blocking position and an unblocking position with respect to the insertion head.

12 Claims, 3 Drawing Sheets

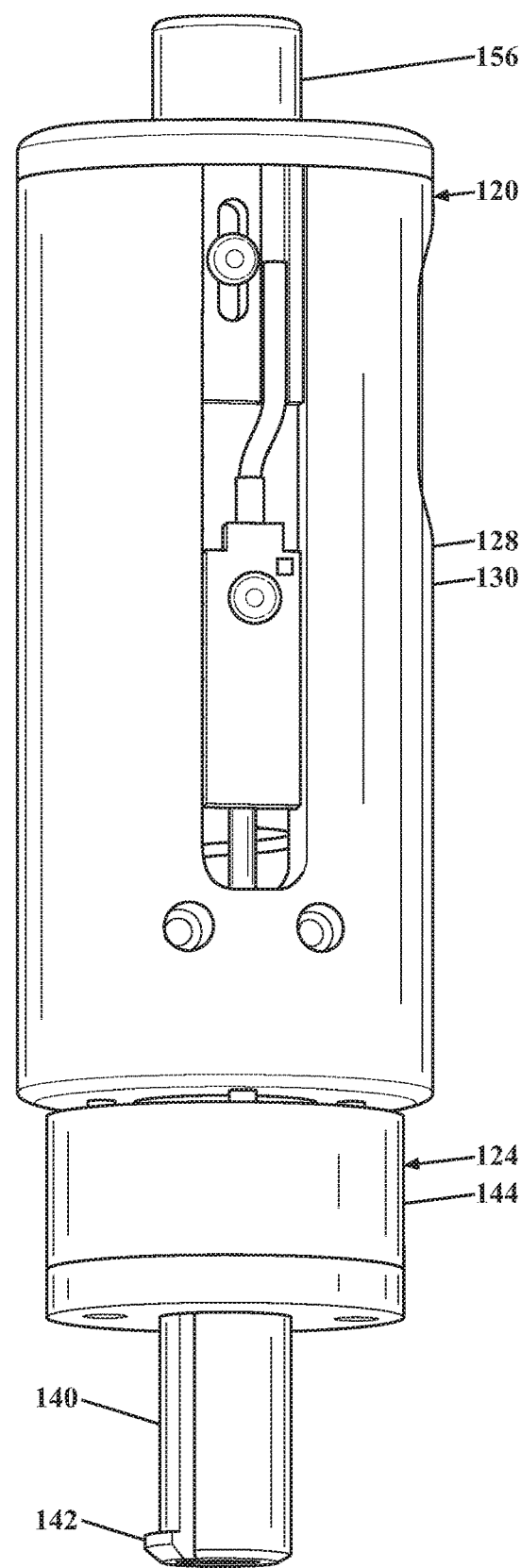
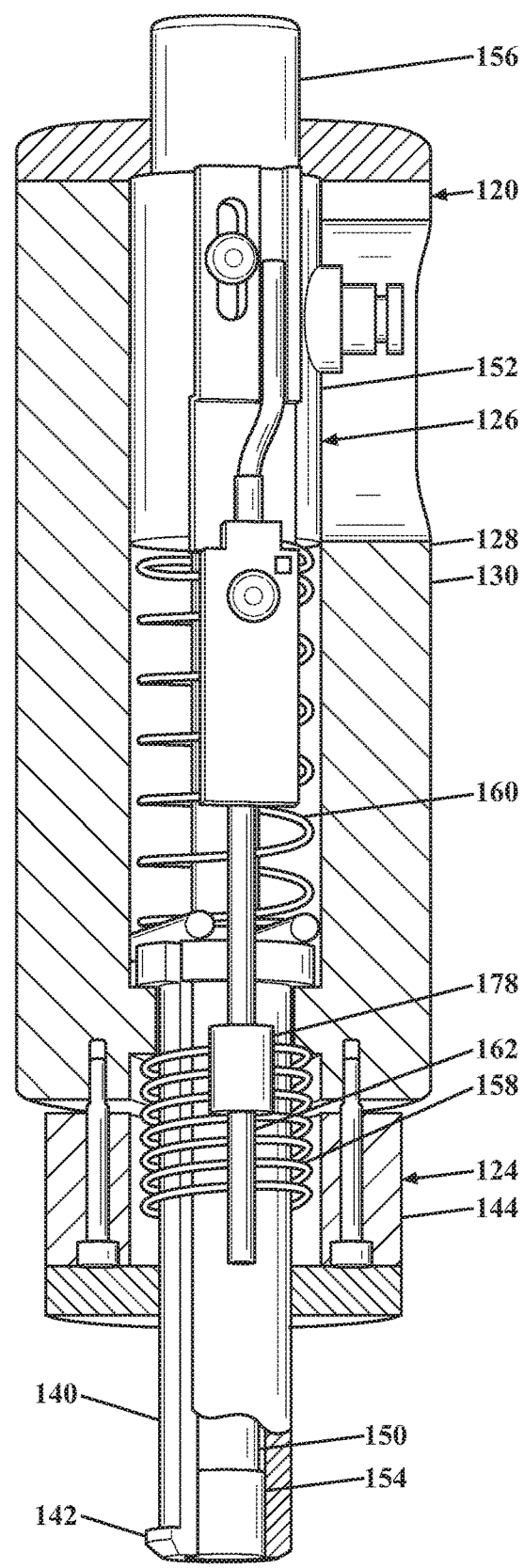
FIG. 2A
FIG. 2B

— 1 —

PNEUMATIC PROBE

TECHNICAL FIELD

The embodiments disclosed herein relate to probing systems for checking the fluid levels of vehicular reservoirs.

BACKGROUND

Today's vehicles include a number of components that use different fluids for operation. Likewise, today's vehicles include different reservoirs for storing different fluids for the components. In association with storing fluid, each reservoir has a fluid level. Likewise, each reservoir includes a port therefor for filling the reservoir with fluid, draining fluid from the reservoir, and checking the fluid level.

Vehicle manufactures seeking quality assurance may employ probing systems to check the fluid levels of different reservoirs for storing different fluids on a vehicle-by-vehicle basis. For each reservoir, to check the fluid level, traditional probing systems use a probe to fiber optically, ultrasonically or otherwise interface with fluid in the reservoir through the port. However, different reservoirs may have various differences beyond storing different fluids, including different ports, shapes, volumes, sightlines through the ports, fluid level specifications and the like. Moreover, different reservoirs, and probes themselves, may be sensitive to cross-contamination between different fluids. Accordingly, traditional probing systems may use probes dedicated to either particular reservoirs or particular fluids, or both. Although traditional probing systems have proven satisfactory, vehicle manufactures, among others, may desire improvements for accommodating both different reservoirs and different fluids without dedicated probes.

SUMMARY

Disclosed herein are embodiments of a pneumatic probe-based pneumatic probing system. In one aspect, the pneumatic probe includes a port adaptor and a pneumatic core. The port adaptor includes an insertion head that includes a hook, and a backstop alongside the insertion head behind, and in spaced opposition with, the hook. The insertion head is reconfigurable between an expanded configuration and a contracted configuration. The backstop is movable, along the insertion head, between an extended position and a retracted position, in which the backstop is respectively advanced toward the hook and backed away from the hook. The pneumatic core includes a downtube extending through the insertion head, and a blocker on the downtube interfaced with the insertion head. The downtube is movable, through the insertion head, between a blocking position and an unblocking position with respect to the insertion head.

This and other aspects will be described in additional detail below.

BRIEF DESCRIPTION OF THE DRAWINGS

The various features, advantages and other uses of the present embodiments will become more apparent by referring to the following detailed description and drawing in which:

FIGS. 2A and 2B are side and side cutaway views of the pneumatic probe, showing a port adaptor for installing the pneumatic probe to the reservoir over the port, and a pneumatic core for making a pneumatic connection with the headspace through the port.

DETAILED DESCRIPTION

This disclosure teaches components of a pneumatic probe-based pneumatic probing system. As opposed to probes dedicated to either particular reservoirs or particular fluids, or both, the pneumatic probe, in conjunction with the pneumatic probing system to which it belongs, is universal as to both different reservoirs and different fluids.

The pneumatic probe is taught with reference to a vehicular reservoir. The reservoir has a fluid level and a headspace, and includes a port for checking the fluid level. The pneumatic probe includes a port adaptor for installing the pneumatic probe to the reservoir over the port. Even as to different reservoirs that include different ports, the pneumatic probe may still be installed to the reservoirs over the ports using the port adaptor. In addition to the port adaptor, the pneumatic probe includes a pneumatic core for making a pneumatic connection with the headspace through the port. Because the determination of the fluid level relies on the pneumatic probe making a pneumatic connection with the headspace through the port using the pneumatic core, the pneumatic probe is non-interfacing with respect to fluid in the reservoir. Accordingly, even as to different reservoirs that have different shapes, volumes, sightlines through their ports and the like, their fluid levels may still be determined. Moreover, because it makes a pneumatic connection with the headspace through the port using the pneumatic core, the pneumatic probe is contactless with respect to fluid in the reservoir. Accordingly, even as to different reservoirs for storing different fluids, the pneumatic probe may be installed to the reservoirs over their ports using the port adaptor without the prospect of cross-contamination between different fluids.

Figure 1:
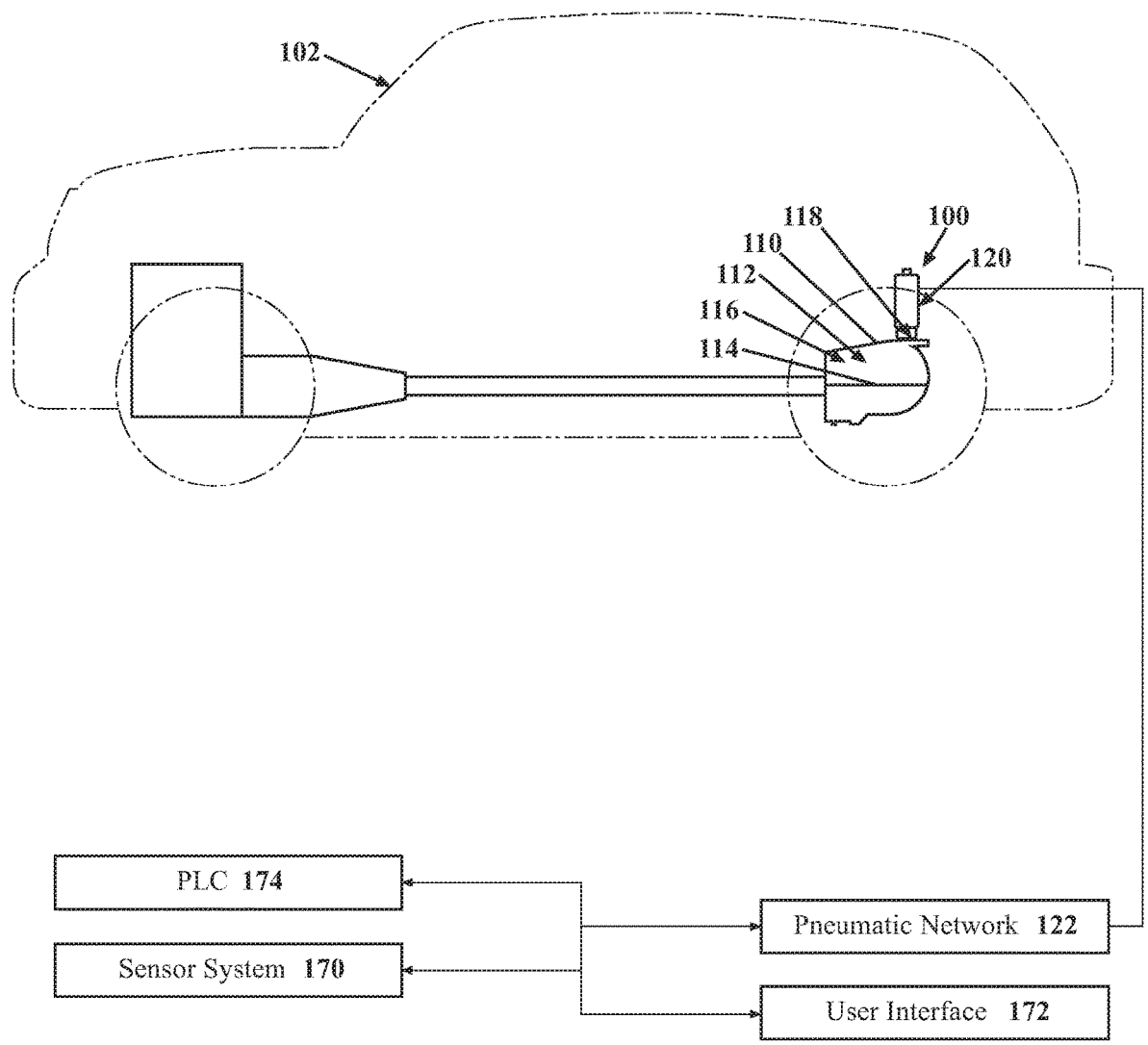
FIG. 1 is a schematic view of a pneumatic probing system, showing, with reference to a vehicular reservoir having a fluid level and a headspace, and including a port for checking the fluid level, a pneumatic probe installed to the reservoir over the port, and making a pneumatic connection with the headspace through the port.

A pneumatic probing system 100 is shown in FIG. 1 with reference to a representative passenger vehicle 102. The vehicle 102 includes an exterior and a number of interior compartments. The compartments include an engine compartment, a passenger compartment, a cargo area and the like. Among other things, the vehicle 102 may include seats, a dash assembly, an instrument panel, controls and the like housed in the passenger compartment. Additionally, the vehicle 102 may include an engine, a motor, a transmission, a differential and the like, as well as other powertrain components, such as wheels, housed in the engine compartment and elsewhere in the vehicle 102. The wheels support the remainder of the vehicle 102 on the ground. One, some or all of the wheels are powered by the remainder of the powertrain components to drive the vehicle 102 along the ground.

The vehicle 102 includes a component 110 that, in turn, includes a representative internal reservoir 112 for storing fluid that the component 110 uses for operation. In association with storing fluid, the reservoir 112 has a fluid level 114, and an inversely proportional headspace 116 over the fluid level 114. The reservoir 112 includes a port 118 therefor for filling the reservoir 112 with fluid, draining fluid from the reservoir 112, and checking the fluid level 114. The port 118 opens to the headspace 116 over, and in spaced opposition with, the fluid level 114. Although the reservoir 112, as shown, is a differential reservoir, it will be understood that this disclosure is applicable in principle to otherwise similar reservoirs typical not only of vehicles, but also other machinery, such as transmission reservoirs, transfer case reservoirs, transaxle reservoirs, twin coupling reservoirs, engine oil reservoirs, hydraulic reservoirs and the like.

The pneumatic probing system 100 includes a pneumatic probe 120 and a pneumatic network 122. As shown with additional reference to FIGS. 2A and 2B, the pneumatic probe 120 includes a port adaptor 124 and a pneumatic core 126, as well as a base 128. Using the port adaptor 124, the pneumatic probe 120 is installed to the reservoir 112 over the port 118. Likewise, the pneumatic probe 120 is reversibly un-installable from the reservoir 112, and re-installable to other reservoirs over their ports. The pneumatic core 126 extends, at least in part, through the port adaptor 124. Using the pneumatic core 126, the pneumatic probe 120 makes a pneumatic connection with the headspace 116 through the port 118. Moreover, the pneumatic probe 120 makes a pneumatic connection with the pneumatic network 122. Accordingly, the pneumatic probe 120 pneumatically connects the pneumatic network 122 with the headspace 116 therethrough. The pneumatic network 122, through the pneumatic probe 120, experiences the gas pressure in the headspace 116, and is operable to add gas, such as air, to the headspace 116. The base 128 supports the port adaptor 124 and the pneumatic core 126 for co-movement therewith, and defines a handgrip 130 for users to handle the pneumatic probe 120, including for installation to the reservoir 112 over the port 118. Moreover, the base 128 supports the port adaptor 124 and the pneumatic core 126, and/or components thereof, for movement relative to one another.

As shown with additional reference to FIGS. 3A-3D, in relation to the port 118, the reservoir 112 includes a bordering area 132 around the port 118. Upon the installation thereof over the port 118, the port adaptor 124 reaches through the port 118, and engages, and clamps, the bordering area 132 from both inside the reservoir 112 and outside the reservoir 112. The pneumatic core 126 reaches through the port 118 together with the port adaptor 124.

The port adaptor 124 includes an insertion head 140 that includes a hook 142 thereon. As shown, the hook 142 is frontally located on the insertion head 140. The insertion head 140 is insertable into the port 118. As it is inserted into the port 118, the insertion head 140 is configured to reach through the port 118, and support the hook 142 inside the reservoir 112. Moreover, the insertion head 140 is configured to engage the bordering area 132 from inside the reservoir 112 using the hook 142. Although the insertion head 140, as shown, includes one hook 142, it will be understood that this disclosure is applicable in principle to otherwise similar pneumatic probes whose port adaptors include insertion heads with multiple hooks thereon. The base 128 immovably supports the insertion head 140. However, the insertion head 140 itself is reconfigurable between an expanded configuration and a contracted configuration. The insertion head 140 is illustrated in the expanded configuration in FIGS. 2A, 2B and 3D, and in the contracted configuration in FIG. 3B. In the expanded configuration, the hook 142 is carried outboard. Contrariwise, in the contracted configuration, the hook 142 is carried inboard.

In addition to the insertion head 140, the port adaptor 124 includes a backstop 144. The backstop 144 is located alongside the insertion head 140 behind, and in spaced opposition with, the hook 142. Unlike the insertion head 140, the backstop 144 is not insertable into the port 118. Instead, as the insertion head 140 is inserted into the port 118, the backstop 144 is configured to engage the bordering area 132 from outside the reservoir 112. The base 128 movably supports the backstop 144. The backstop 144 is movable, and the base 128 supports the backstop 144 for movement, along the insertion head 140, between an extended position and a retracted position. The backstop 144 is illustrated in the extended position in FIGS. 2A and 2B, and in the retracted position in FIG. 3A. In FIG. 3C, the backstop 144 is illustrated in a representative semi-extended position. In the extended position, the backstop 144 is advanced toward the hook 142. Likewise, in the semi-extended position, the backstop 144 is advanced toward the hook 142, but not as much compared to the extended position. Contrariwise, in the retracted position, the backstop 144 is backed away from the hook 142.

As best shown in FIG. 2B, the pneumatic core 126 includes a downtube 150 and a pneumatic fitting 152. The pneumatic fitting 152 is pneumatically connected with the downtube 150. The downtube 150 extends behind the insertion head 140, and through the insertion head 140 from behind. The pneumatic fitting 152 is located behind the downtube 150, and behind, and in spaced opposition with, the insertion head 140. The pneumatic fitting 152 is configured to make a pneumatic connection with the pneumatic network 122. The downtube 150 is insertable into the port 118 together with the insertion head 140. As the insertion head 140 is inserted into the port 118, the downtube 150 is configured to reach through the port 118 together with the insertion head 140, and make a pneumatic connection with the headspace 116 through the port 118.

In addition to the downtube 150, the pneumatic core 126 includes a blocker 154 on the downtube 150. As shown, the blocker 154 is frontally located on the downtube 150. Likewise, the blocker 154 is interfaced with the insertion head 140. In addition to the blocker 154, the pneumatic core 126 includes a button 156. The button 156 is located behind the downtube 150, and behind the pneumatic fitting 152. Likewise, the button 156 is located behind, and in spaced opposition with, the insertion head 140. The base 128 movably supports the pneumatic core 126. The pneumatic core 126 is moveable, and the base 128 supports the pneumatic core 126 for movement, responsive to manipulation of the button 156. Likewise, via co-movement with the pneumatic core 126, the base 128 movably supports the downtube 150, the pneumatic fitting 152 and the button 156. For instance, the downtube 150 is moveable, and the base 128 supports the downtube 150 for movement, through the insertion head 140, between a blocking position and an unblocking position, responsive to manipulation of the button 156. The downtube 150 is illustrated in the blocking position in FIGS. 2A, 2B, 3C and 3D, and in the unblocking position in FIGS. 3A and 3B. In the blocking position, the blocker 154 blocks the insertion head 140 into assuming the expanded configuration. Contrariwise, in the unblocking position, the blocker 154 unblocks the insertion head 140 for assuming the contracted configuration.

As best shown in FIG. 2B, the backstop 144 is biased for movement to the extended position. As shown, the pneumatic probe 120 includes a backstop spring 158. The backstop spring 158 is engaged between the base 128 and the backstop 144, and biases the backstop 144 against the base 128 for movement to the extended position. Moreover, the downtube 150 is biased for movement to the blocking position. As shown, the pneumatic probe 120 includes a downtube spring 160. The downtube spring 160 is engaged between the base 128 and the downtube 150, and biases the downtube 150 against the base 128 for movement to the blocking position.

As best shown in FIG. 2B, in one implementation, the base 128, the insertion head 140, the backstop 144 and the pneumatic core 126 have axially aligned cylindrical structures, and the base 128 defines a pistol-style handgrip 130 for handling the pneumatic probe 120.

The base 128, the insertion head 140 and the backstop 144 have axially aligned tubular structures. The outside of the insertion head 140 corresponds to the inside of the base 128. The insertion head 140 is located in partial overlap with the base 128, and secured outside-to-inside with the base 128. The hook 142 is a barb-like semi-annular structure on the outside of the insertion head 140. The insertion head 140 is split along its length to enable reconfiguration between the expanded configuration and the contracted configuration. The inside of the backstop 144 corresponds to the outside of the insertion head 140, and the inside of the base 128. The backstop 144 is located around the insertion head 140, and end-to-end with the base 128. As shown, the backstop spring 158 is a helical compression spring located inside the backstop 144, and around the insertion head 140. The pneumatic probe 120 includes one or more pins 162 that enable the base 128 to support the backstop 144 for movement between the extended position and the retracted position. The pins 162 run between the base 128 and the backstop 144. As shown, the pneumatic probe 120 includes a plurality of (e.g., four) circumferentially spaced pins 162 running between the base 128 and the backstop 144. The pins 162 slidingly guide the movement of the backstop 144 between the extended position and the retracted position. As shown, the pins 162 are secured with the backstop 144, and slidingly engaged with the base 128.

The pneumatic core 126 has a compound cylindrical structure. The downtube 150 has a tubular structure. The outside of the downtube 150 corresponds to the inside of the insertion head 140. The blocker 154 is a step-like annular structure on the outside of the downtube 150. The pneumatic fitting 152 has a cylindrical structure. The outside of the pneumatic fitting 152 corresponds to the inside of the base 128. The pneumatic fitting 152 is located inside the base 128. The base 128 exposes the pneumatic fitting 152 from the side for making a pneumatic connection with the pneumatic network 122. The button 156 has a cylindrical structure common with the pneumatic fitting 152. The button 156 is located in partial overlap with the base 128. The base 128 exposes the button 156 from behind for manipulation. To enable the base 128 to support the pneumatic core 126 for movement, and support the downtube 150 for movement between the blocking position and the unblocking position via co-movement with the pneumatic core 126, the pneumatic fitting 152 is slidingly engaged with the base 128, and the downtube 150 is slidingly engaged with the insertion head 140. Likewise, the blocker 154 is slidingly interfaced with the insertion head 140. In the blocking position, the blocker 154 enters the insertion head 140 to block it into assuming the expanded configuration. Contrariwise, in the unblocking position, the blocker 154 exits the insertion head 140 to unblock it for assuming the contracted configuration. As shown, the downtube spring 160 is a helical compression spring located inside the base 128, and around the downtube 150.

As shown in FIGS. 2A and 2B, before the installation of the port adaptor 124 over the port 118, the backstop 144 normally assumes the extended position. Specifically, absent engagement with the bordering area 132 from outside the reservoir 112, the backstop 144 normally assumes the extended position responsive to the bias for movement thereto. Accordingly, the backstop 144 is normally advanced toward the hook 142. Moreover, the downtube 150 normally assumes the blocking position. Specifically, absent manipulation of the button 156, the downtube 150 normally assumes the blocking position responsive to the bias for movement thereto. Accordingly, the blocker 154 normally blocks the insertion head 140 into assuming the expanded configuration. Likewise, the insertion head 140 normally assumes the expanded configuration responsive to the downtube 150 normally assuming the blocking position. Specifically, the insertion head 140 normally assumes the expanded configuration responsive to the blocker 154 normally blocking it into assuming the expanded configuration. Accordingly, the hook 142 is normally carried outboard.

Figure 3A:
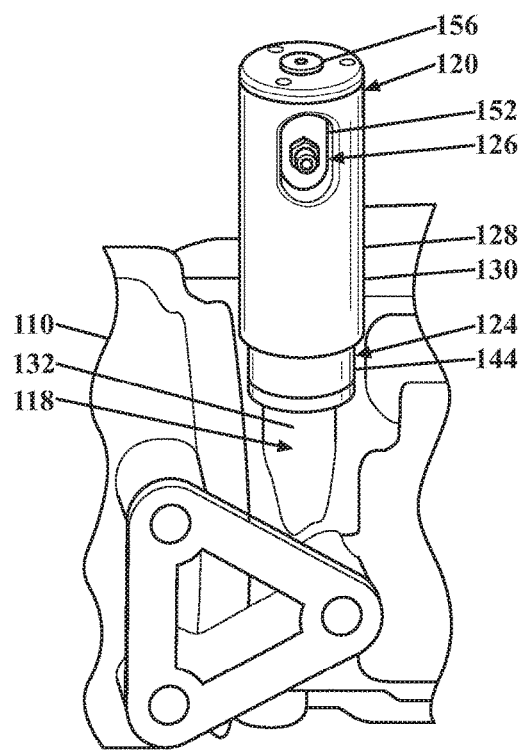
FIGS. 3A-3D are perspective views of the reservoir and the pneumatic probe, showing aspects of the installation of the pneumatic probe over the port using the port adaptor, and the pneumatic probe making a pneumatic connection with the headspace through the port using the pneumatic core.
Figure 3C:
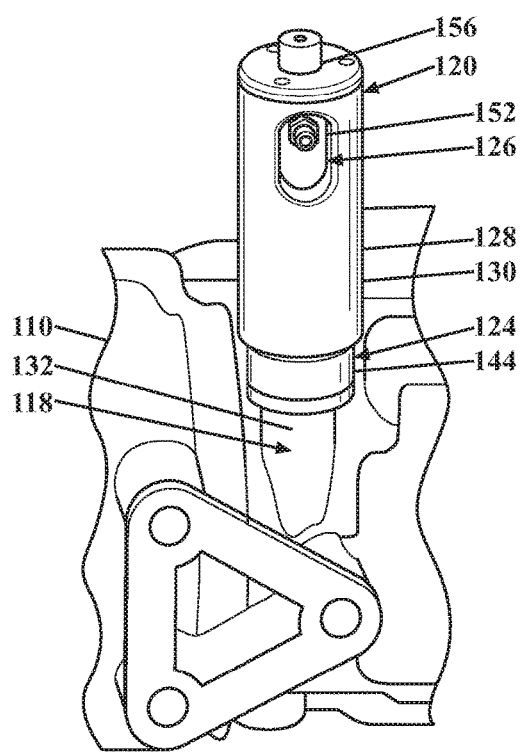
Figure 3B:
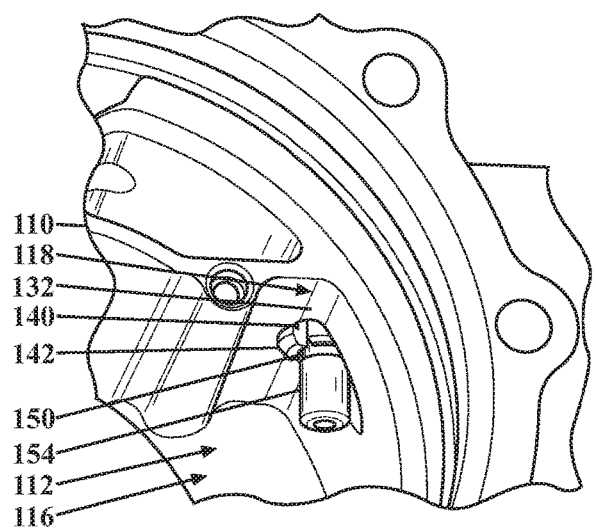

As shown with additional reference to FIGS. 3A and 3B, at the commencement of the installation of the port adaptor 124 over the port 118, the button 156 is manipulated in preparation for handling the pneumatic probe 120 to insert the insertion head 140 into the port 118. The downtube 150, against the bias for movement to the blocking position, is moved therefrom to the unblocking position responsive to manipulation of the button 156. Accordingly, the blocker 154 unblocks the insertion head 140 for assuming the contracted configuration. Likewise, the insertion head 140 is reconfigured from the expanded configuration to the contracted configuration responsive to the blocker 154 unblocking it for assuming the contracted configuration. Accordingly, the hook 142 is carried inboard, instead of outboard, for passage through the port 118. As the pneumatic probe 120 is handled to insert the insertion head 140 into the port 118, the insertion head 140 reaches through the port 118 until it supports the hook 142 inside the reservoir 112. Likewise, the downtube 150 reaches through the port 118 together with the insertion head 140. Moreover, the backstop 144 engages the bordering area 132 from outside the reservoir 112. The backstop 144, against the bias for movement to the extended position, is moved therefrom to the retracted position responsive to engagement with the bordering area 132 from outside the reservoir 112. Accordingly, the backstop 144 is backed away from the hook 142 to clear the insertion head 140 to not only reach through the port 118, but also to support the hook 142 inside the reservoir 112.

Figure 3D:
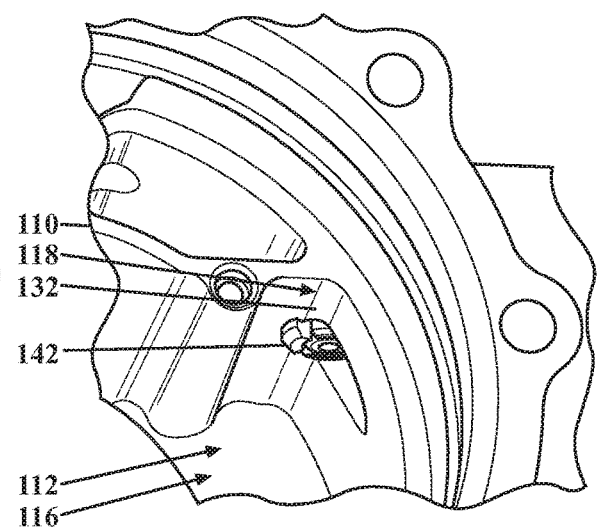

As shown with additional reference to FIGS. 3C and 3D, at the culmination of the installation of the port adaptor 124 over the port 118, the button 156 is de-manipulated. Absent manipulation of the button 156, the downtube 150 is moved from the unblocking position to the blocking position responsive to the bias for movement thereto. Accordingly, the blocker 154 blocks the insertion head 140 into assuming the expanded configuration. Likewise, the insertion head 140 is reconfigured from the contracted configuration to the expanded configuration responsive to the blocker 154 blocking it into assuming the expanded configuration. Accordingly, the hook 142 is carried outboard, instead of inboard, for engagement with the bordering area 132 from inside the reservoir 112. Moreover, the backstop 144, in engagement with the bordering area 132 from outside the reservoir 112, is moved from the retracted position to the semi-extended position responsive to the bias for movement to the extended position. Accordingly, the backstop 144 is advanced toward the hook 142 to draw the hook 142 into engagement with the bordering area 132 from inside the reservoir 112.

Upon the installation of the port adaptor 124 over the port 118, with the insertion head 140 reaching through the port 118, and supporting the hook 142 inside the reservoir 112, and with the backstop 144 in engagement with the bordering area 132 from outside the reservoir 112, and drawing the hook 142 into engagement with the bordering area 132 from inside the reservoir 112, the bordering area 132 is clamped from both inside the reservoir 112 and outside the reservoir 112. Moreover, with the downtube 150 reaching through the port 118 together with the insertion head 140, the pneumatic core 126 makes a pneumatic connection with the headspace 116 through the port 118. Either the insertion head 140 or the backstop 144, or both, may include a resilient sealing structure for making a pneumatic seal with the bordering area 132. For instance, the insertion head 140 may include an O-ring atop the hook 142 for making a pneumatic seal with the bordering area 132 from inside the reservoir 112. For instance, the backstop 144 may include a urethane cap for making a pneumatic seal with the bordering area 132 from outside the reservoir 112.

As noted above, the pneumatic network 122, through the pneumatic probe 120, experiences the gas pressure in the headspace 116, and is operable to add gas to the headspace 116. With reference once again to FIG. 1, in addition to the pneumatic probe 120 and the pneumatic network 122, the pneumatic probing system 100 includes a sensor system 170, a user interface 172 and a PLC 174 (i.e., a programmable logic controller). The sensor system 170 is operable to detect information about the pneumatic probing system 100. The user interface 172 serves as an interface between users and the pneumatic probing system 100 itself, and is operable to issue tactile, sound and visual outputs that may be sensed by users. The PLC 174 includes one or more processors, memory, and a control module with which the pneumatic network 122, the sensor system 170 and the user interface 172 are communicatively connected. The processors, the memory and the control module together serve as a computing device whose control module is employable to operate the pneumatic probing system 100. Accordingly, as a prerequisite to operating the pneumatic probing system 100, the control module gathers information about the pneumatic probing system 100, including the information about the pneumatic probing system 100 detected by the sensor system 170. The control module then evaluates the information about the pneumatic probing system 100, and operates the pneumatic probing system 100 based on its evaluation.

As part of the sensor system 170, the pneumatic probing system 100 includes one or more sensors, including one or more sensors onboard the pneumatic probe 120, and one or more sensors in the pneumatic network 122. The sensors monitor the pneumatic probing system 100 in real-time. The sensors, on behalf of the sensor system 170, are operable to detect information about the pneumatic probing system 100, including information about the pneumatic probe 120, and information about the pneumatic network 122. Among information about the pneumatic probing system 100, the sensor system 170 is operable to detect the movement of the backstop 144, the gas pressure in the headspace 116, and the amount of gas added to the headspace 116. Relatedly, among the sensors, the pneumatic probing system 100 includes one or more installation sensors 178 onboard the pneumatic probe 120, and one or more pneumatic sensors in the pneumatic network 122. For instance, as best shown in FIG. 2B, the pneumatic probe 120 includes an onboard installation sensor 178 operable to detect the movement of the backstop 144. As shown, the installation sensor 178 is a proximity sensor operable to detect the movement of the backstop 144 off one of the pins 162.

With respect to the PLC 174, the control module gathers information about the pneumatic probing system 100 for evaluation, including the movement of the backstop 144, the gas pressure in the headspace 116, the amount of gas added to the headspace 116, and other information about the pneumatic probing system 100 detected by the sensor system 170. The control module monitors for and identifies the movement of the backstop 144, and, based thereon, identifies the installation of the port adaptor 124 over the port 118. For instance, the control module may identify the installation of the port adaptor 124 over the port 118 based on the movement of the backstop 144 from the extended position to the retracted position, and then from the retracted position to the semi-extended position. In response to the installation of the port adaptor 124 over the port 118, the control module identifies the semi-extended position of the backstop 144, and, based thereon, identifies the fluid level specification of the reservoir 112. For instance, the depth of the port 118 establishes the semi-extended position. Equally, the semi-extended position is indicative of the depth of the port 118. Accordingly, the control module may identify the fluid level specification based on known relationships between it and any combination of the semi-extended position, the depth of the port 118, the port 118 and the reservoir 112.

Moreover, the control module operates the pneumatic network 122 to add gas to the headspace 116. In association with the addition of gas to the headspace 116, the control module monitors for and identifies the gas pressure in the headspace 116, and the amount of gas added to the headspace 116, and, based thereon, determines the fluid level 114 of the reservoir 112. For instance, the control module may determine the fluid level 114 based on known relationships between it and any combination of the gas pressure in the headspace 116, the amount of gas added to the headspace 116, the volume of the headspace 116 and the volume of the reservoir 112. For instance, the known relationships may include one or more gas laws, such as the ideal gas law. For instance, in a volume measurement implementation of the pneumatic probe 120 and the pneumatic probing system 100 to which it belongs, the known relationships may include the inverse proportionality between the fluid level 114 and the headspace 116. Likewise, the control module may determine the volume of the headspace 116 based on the gas pressure in the headspace 116, the amount of gas added to the headspace 116, and one or more gas laws, and may determine the fluid level 114 based on the volume of the headspace 116 and the inverse proportionality between the fluid level 114 and the headspace 116. Moreover, the control module compares the fluid level 114 with the fluid level specification, and, based thereon, determines whether the fluid level 114 satisfies the fluid level specification. Moreover, the control module operates the user interface 172 to issue a notification indicating whether the fluid level 114 satisfies the fluid level specification.

As opposed to probes dedicated to either particular reservoirs or particular fluids, or both, the pneumatic probe 120, in conjunction with the pneumatic probing system 100 to which it belongs, is universal as to both different reservoirs and different fluids. For instance, as noted above, the depth of the port 118 establishes the semi-extended position. However, it will be understood that the backstop 144 may assume other semi-extended positions. Accordingly, even as to different reservoirs that include different ports, the pneumatic probe 120 may still be installed to the reservoirs over the ports using the port adaptor 124. Likewise, based on semi-extended positions specific to the reservoirs, the control module may identify their fluid level specifications. Moreover, because the determination of the fluid level 114 relies on the pneumatic probe 120 making a pneumatic connection with the headspace 116 through the port 118 using the pneumatic core 126, the pneumatic probe 120 is non-interfacing with respect to fluid in the reservoir 112. Accordingly, even as to different reservoirs that have different shapes, volumes, sightlines through their ports and the like, their fluid levels may still be determined. Moreover, because it makes a pneumatic connection with the headspace 116 through the port 118 using the pneumatic core 126, the pneumatic probe 120 is contactless with respect to fluid in the reservoir 112. Accordingly, even as to different reservoirs for storing different fluids, the pneumatic probe 120 may be installed to the reservoirs over their ports using the port adaptor 124 without the prospect of cross-contamination between different fluids.

As noted above, the processors, the memory and the control module of the PLC 174 together serve as a computing device whose control module is employable to operate the pneumatic probing system 100. The processors may be any components configured to execute any of the processes described herein or any form of instructions to carry out such processes or cause such processes to be performed. The processors may be implemented with one or more general-purpose or special-purpose processors. Examples of suitable processors include microprocessors, microcontrollers, digital signal processors or other forms of circuitry that execute software. Other examples of suitable processors include without limitation central processing units (CPUs), array processors, vector processors, digital signal processors (DSPs), field programmable gate arrays (FPGAs), programmable logic arrays (PLAs), application specific integrated circuits (ASICs), programmable logic circuitry or controllers. The processors may include at least one hardware circuit (e.g., an integrated circuit) configured to carry out instructions contained in program code. In arrangements where there are multiple processors, the processors may work independently from each other or in combination with one another.

The memory is a non-transitory computer readable medium. The memory may include volatile or nonvolatile memory, or both. Examples of suitable memory includes random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives or any other suitable storage medium, or any combination of these. The memory includes stored instructions in program code. Such instructions are executable by the processors or the control module. The memory may be part of the processors or the control module, or may be communicatively connected the processors or the control module.

Generally speaking, the control module includes instructions that may be executed by the processors. The control module may be implemented as computer readable program code that, when executed by the processors, execute one or more of the processes described herein. Such computer readable program code may be stored on the memory. The control module may be part of the processors, or may be communicatively connected the processors.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A pneumatic probe, comprising:
   a port adaptor, the port adaptor including an insertion head that includes a hook, and a backstop alongside the insertion head behind, and in spaced opposition with, the hook, wherein the insertion head is reconfigurable between an expanded configuration and a contracted configuration, in which the hook is respectively carried outboard and carried inboard, and the backstop is movable, along the insertion head, between an extended position and a retracted position, in which the backstop is respectively advanced toward the hook and backed away from the hook; and
   a pneumatic core, the pneumatic core including a downtube extending through the insertion head, and a blocker on the downtube interfaced with the insertion head, wherein the downtube is movable, through the insertion head, between a blocking position and an unblocking position, in which the blocker respectively blocks the insertion head into assuming the expanded configuration and unblocks the insertion head for assuming the contracted configuration.

2. The pneumatic probe of claim 1, wherein the blocker is frontally located on the downtube, and the hook is frontally located on the insertion head.

3. The pneumatic probe of claim 1, wherein the pneumatic core includes a pneumatic fitting pneumatically connected with the downtube, and the pneumatic fitting is configured to make a pneumatic connection with a pneumatic network.

4. The pneumatic probe of claim 1, wherein the pneumatic core includes a button behind the downtube, and the downtube is movable between the blocking position and the unblocking position responsive to manipulation of the button.

5. The pneumatic probe of claim 1, wherein the downtube is movable between the blocking position and the unblocking position via co-movement with the pneumatic core.

6. The pneumatic probe of claim 1, wherein:
   the blocker is slidingly interfaced with the insertion head; and
   in the blocking position, the blocker enters the insertion head to block it into assuming the expanded configuration, and in the unblocking position, the blocker exits the insertion head to unblock it for assuming the contracted configuration.

7. The pneumatic probe of claim 1, wherein the backstop normally assumes the extended position.

8. The pneumatic probe of claim 1, wherein the backstop is biased for movement to the extended position.

9. The pneumatic probe of claim 1, wherein the downtube normally assumes the blocking position, and the insertion head normally assumes the expanded configuration responsive to the downtube normally assuming the blocking position.

10. The pneumatic probe of claim 1, wherein the downtube is biased for movement to the blocking position.

11. The pneumatic probe of claim 1, further comprising:
    a sensor operable to detect movement of the backstop.

12. The pneumatic probe of claim 1, further comprising:
a base, the base defining a handgrip for handling the pneumatic probe, immovably supporting the insertion head, supporting the backstop for movement between the extended position and the retracted position, and supporting the downtube for movement between the blocking position and the unblocking position.

\* \* \* \* \*